United States Patent [19]
Turner et al.

[11] Patent Number: 5,613,776
[45] Date of Patent: Mar. 25, 1997

[54] THERMAL SHOCK INSERT

[75] Inventors: Robert M. Turner, Holland; Russell N. Barnes, Fennville, both of Mich.

[73] Assignee: Environmental Screening Technology, Inc., Zeeland, Mich.

[21] Appl. No.: 278,545

[22] Filed: Jul. 20, 1994

[51] Int. Cl.[6] .............................. F25B 29/00; G01N 3/60
[52] U.S. Cl. .............................. 374/57; 73/865.6; 165/61
[58] Field of Search .............................. 374/45, 57, 208, 374/210; 73/865.6; 165/27, 58, 61

[56] References Cited

U.S. PATENT DOCUMENTS

| | | | |
|---|---|---|---|
| 4,854,726 | 8/1989 | Lesley et al. | 374/57 |
| 5,147,136 | 9/1992 | Hartley et al. | 73/865.6 |
| 5,167,451 | 12/1992 | Muller et al. | 374/57 |
| 5,294,199 | 3/1994 | Boersen et al. | 374/57 |

FOREIGN PATENT DOCUMENTS

| | | | |
|---|---|---|---|
| 2-96635 | 4/1990 | Japan | 374/57 |
| 2-96633 | 4/1990 | Japan | 374/57 |
| 3-249541 | 11/1991 | Japan | 374/57 |
| 1370522 | 1/1988 | U.S.S.R. | 374/57 |

OTHER PUBLICATIONS

Instruction Manual for Thermotron Environmental Chamber, Model F–32–CHV–705–705.
Thermotron "Electrodynamic Vibration Testing Systems," brochure Number Form 4178.
Thermotron "Environmental Simulation Equipment and Systems," brochure Number Form T10–043–381.
Thermotron "General Catalog," Number T14–047.

*Primary Examiner*—William A. Cuchlinski, Jr.
*Assistant Examiner*—Andrew Hirshfeld
*Attorney, Agent, or Firm*—Price, Heneveld, Cooper, Dewitt & Litton

[57] ABSTRACT

A thermal shock insert or adaptor is used with an environmental chamber to provide a facility for conducting thermal shock testing. The thermal shock adaptor has a cabinet defining an interior specimen chamber. A chamber opening is provided through the cabinet and a specimen platform which is movable relative to the cabinet is provided to receive and support a test specimen and to move the specimen through the chamber opening, between a first position in which the specimen is contained within the specimen chamber and a second position in which the specimen is contained within the environmental chamber with which the thermal shock adaptor is used. The thermal shock adaptor is also provided with a high temperature plenum, heating coils, and a high temperature controller, all operatively connected with the specimen chamber to maintain the specimen chamber at a selected temperature in accordance with predetermined specifications.

14 Claims, 3 Drawing Sheets

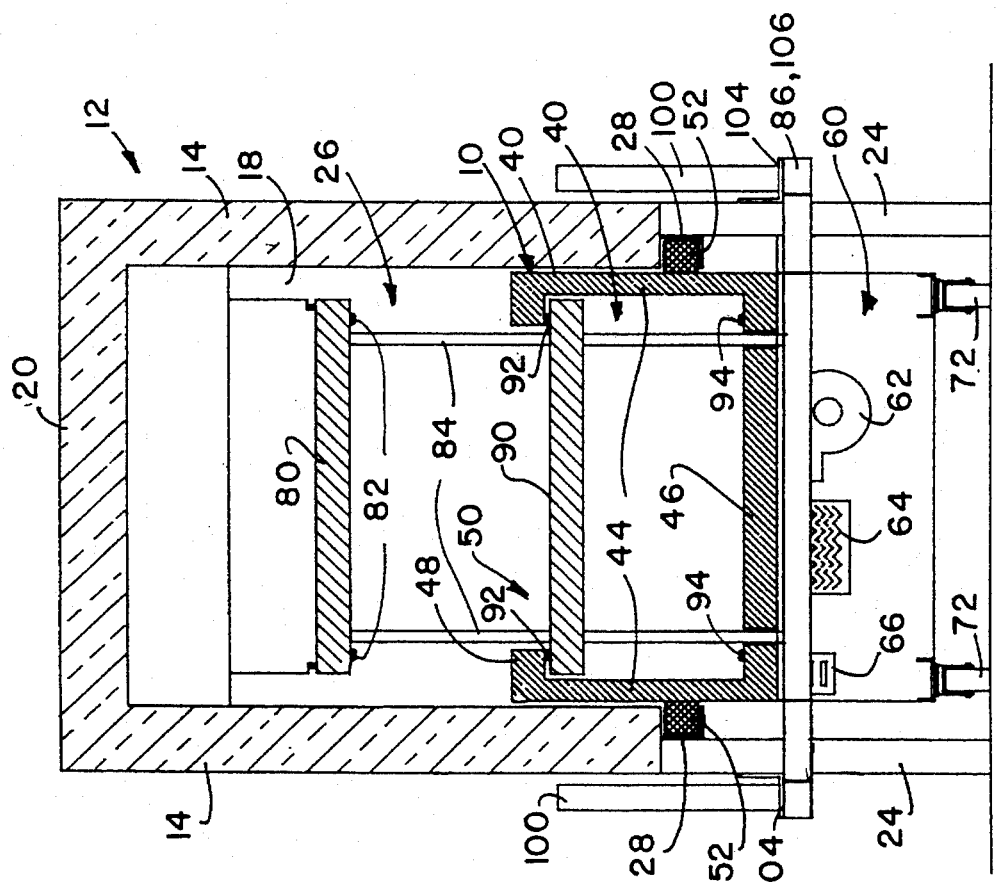
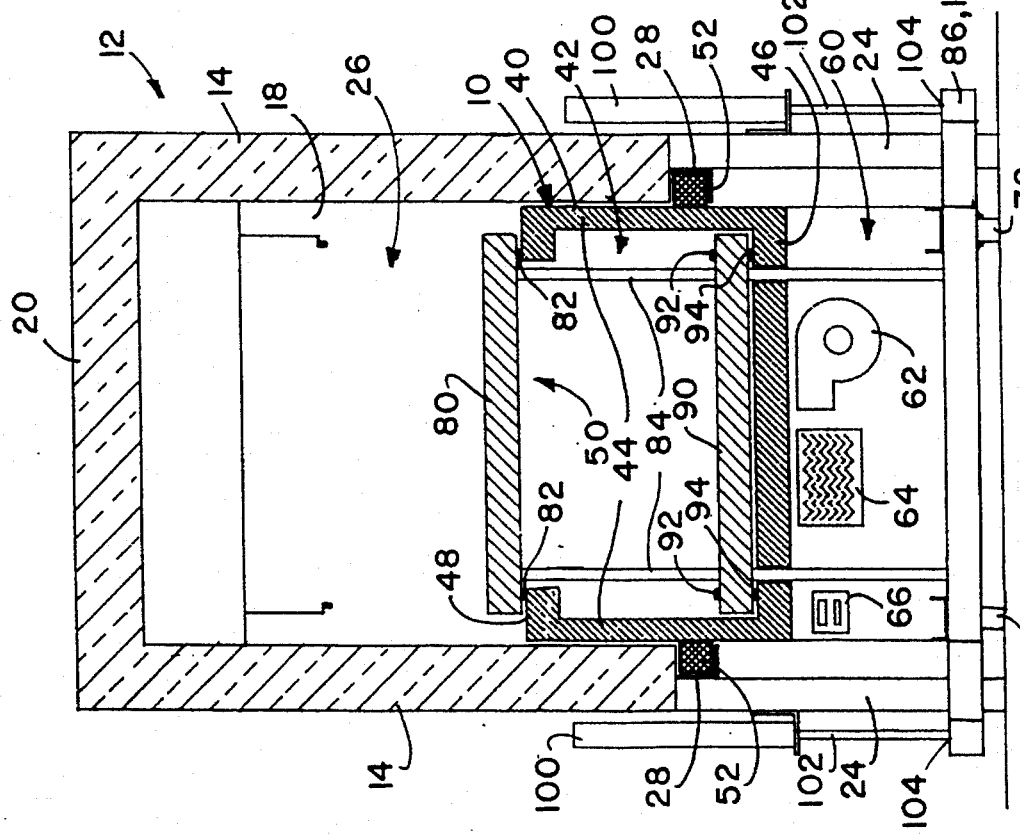
FIG 3
FIG 2

THERMAL SHOCK INSERT

BACKGROUND OF THE INVENTION

The invention relates to environmental testing of electronic equipment and more particularly to thermal shock testing.

A wide array of sophisticated electronic equipment is present in everyday life. While many of us may not be immediately aware of the extent to which electronics is involved in our day-to-day activities, the absence of electronics in our daily lives would be immediately apparent. For example, the contemporary automobile may have anywhere from about two to about twenty, or more, computer modules or processing units to monitor and manage various operating systems. Such operating systems may include engine ignition, transmission shifting, engine fueling, speed control, heating, and air conditioning, to mention only a few.

It is important to the contemporary lifestyle that the electronics present in our lives be durable and reliable, rather than being prone to failure. Electronics are, therefore, typically subjected to various durability and reliability tests during manufacture and prior to release for public acquisition. Such testing includes environmental testing which is commonly conducted in accordance with the recommendations of the Advisory Group on Reliability of Electronic Equipment (AGREE).

Literally thousands of environmental chambers, including chambers that comply with the AGREE recommendations and are known as AGREE chambers, are in use throughout the country for product testing under specific temperature and humidity conditions. These known environmental chambers are, however, typically steady state devices. That is, these chambers are quite apt at maintaining a steady temperature and humidity condition, but are not particularly suited to thermal shock testing that requires rapid temperature change. Such known environmental chambers commonly provide a maximum temperature transition rate of about 5° C. per minute. Some high performance environmental chambers are known to provide a temperature transition rate as high as about 30° C. per minute. But, even these high performance chambers do not meet accepted thermal shock testing requirements.

Thus, separate, specialized thermal shock chambers have been developed to meet the rapid temperature change requirements for thermal shock electronic testing. Thermal shock test chambers commonly provide a cold chamber temperature as low as about −73° C. and a hot chamber temperature as high as 177° C. Commonly known thermal shock chambers are specialized pieces of test equipment and are, accordingly, rather expensive to acquire, costing from about fifty to one hundred thousand dollars and more.

Accordingly, one may appreciate the need for a lower cost alternative to acquiring a dedicated thermal shock chamber. And more particularly, one will appreciate the desirability of adapting the many existing environmental chambers to perform thermal shock testing.

SUMMARY OF THE INVENTION

Accordingly, the present invention provides a thermal shock insert which conveniently and relatively inexpensively converts or adapts a conventional environmental chamber, including AGREE chambers, for thermal shock testing.

A thermal shock insert according to the invention has a cabinet that defines a specimen chamber inside the cabinet, a heating device operatively connected with the specimen chamber, a specimen platform, and a slide interconnecting the specimen platform and the cabinet. The cabinet has a panel with a chamber opening through the panel, the specimen chamber being connected with the outside of the cabinet through the chamber opening. The heating device heats the specimen chamber according to predetermined specifications. And, the specimen platform is movable relative to the cabinet to move a specimen through the chamber opening so the slide slides the specimen platform and moves the specimen through the cabinet opening between a first position in which the specimen is substantially contained within the specimen chamber and a second position in which the specimen is positioned substantially outside the specimen chamber and inside an environmental chamber.

These and other features, objects, and benefits of the invention will be recognized by those who practice the invention and by those skilled in the art, from the specification, the claims, and the drawing figures.

BRIEF DESCRIPTION OF THE DRAWINGS

FIG. 2 is a cross-sectional view along section line ll—ll, showing the thermal shock insert positioned within the environmental test chamber with the specimen platform lowered;

FIG. 3 is the view of FIG. 2, showing the specimen platform elevated; and

DESCRIPTION OF THE PREFERRED EMBODIMENTS

Figure 1:
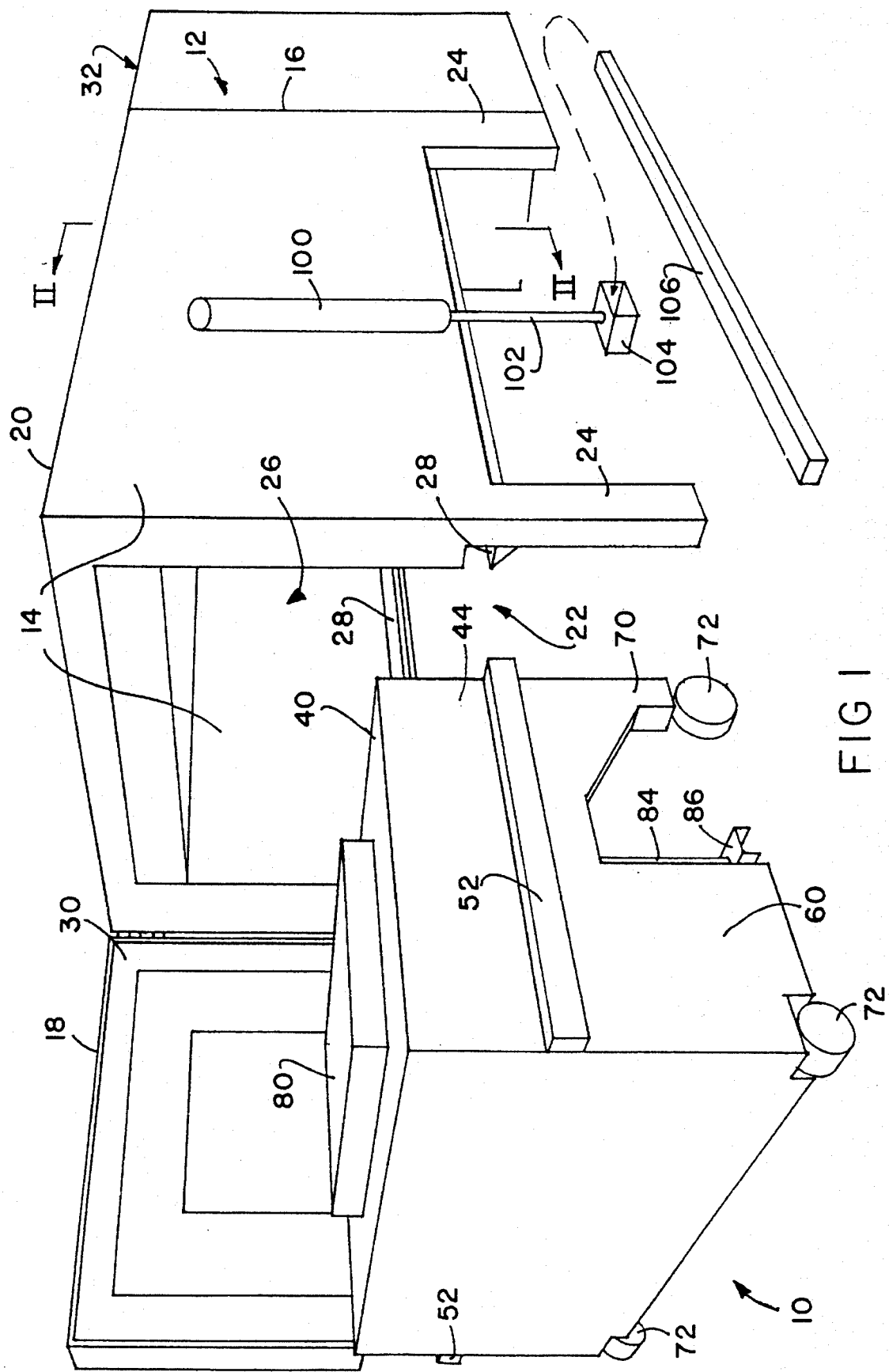
FIG. 1 is a perspective view of a thermal shock insert according to the invention staged in front of an environmental chamber.
Figure 4:
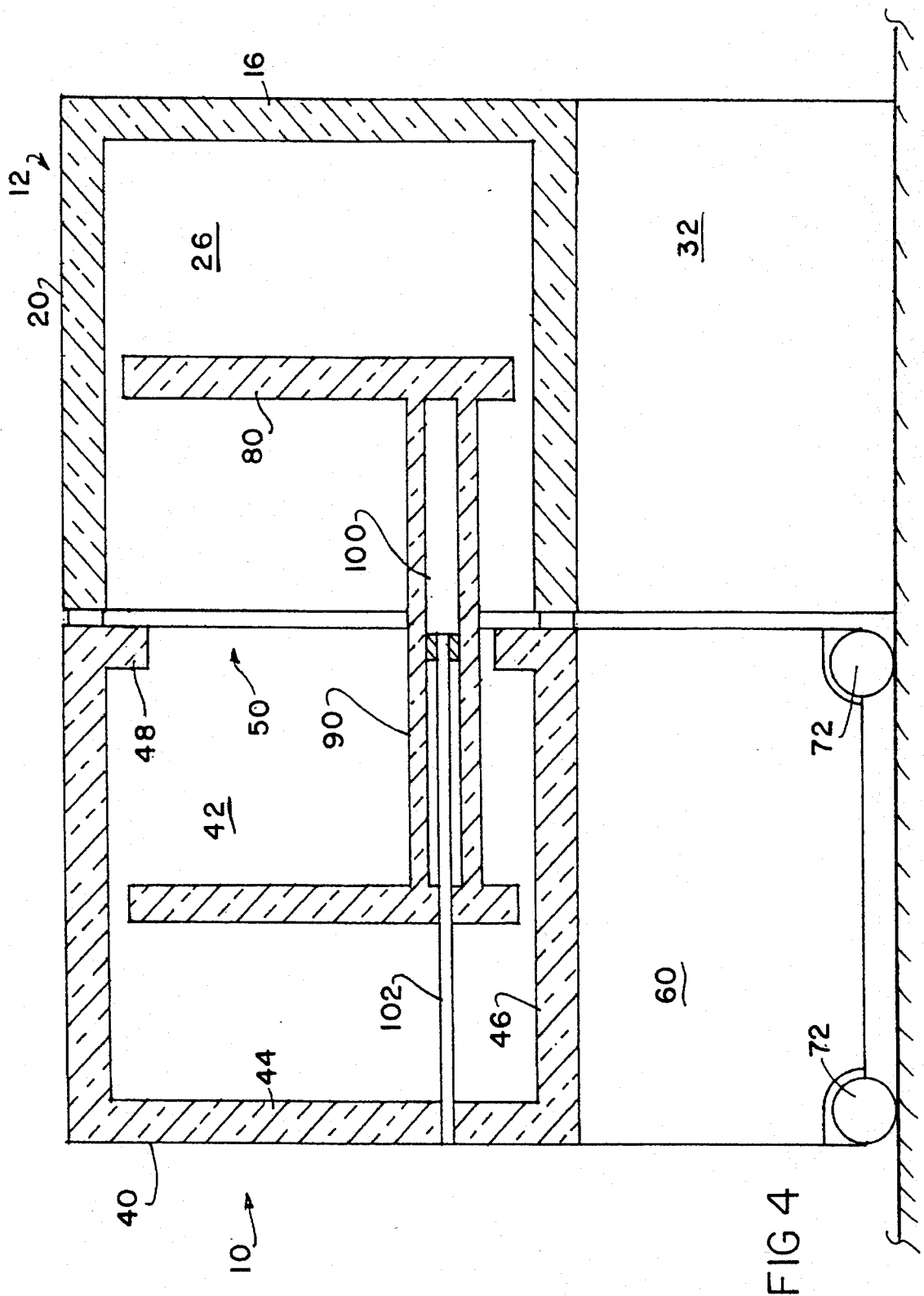
FIG. 4 is a longitudinal cross-sectional view of an alternative configuration of a thermal shock insert according to the invention for use with an alternative environmental chamber configuration.

With reference to the drawing figures in greater detail, a thermal shock insert or adaptor according to the invention is generally identified in the drawing figures by the reference numeral 10. Thermal shock insert 10 is particularly configured as shown for use with an environmental chamber 12 of common configuration as is shown in FIG. 1, for example. It will be understood by those who practice the invention, those who are skilled in the art, and those who are otherwise familiar with environmental chambers that a thermal shock insert or adaptor according to the invention may have any of various configurations which are suitable for use with the various configurations of environmental chambers. As an example, an alternative thermal shock insert configuration according to the invention is shown in FIG. 4.

Environmental chamber 12, as shown in FIGS. 1–3, is basically a large empty box with two opposing sidewalls 14, an end wall 16, a door 18 opposite end wall 16, a top 20, and an open bottom 22, positioned on legs 24 and defining a test chamber 26. Top 20, sidewalls 14, end wall 16, and door 18 of environmental chamber 12 are constructed with a thick barrier of non-settling and low thermal conductivity insulation and a durable cladding, such as series 300 stainless steel, for example, or other suitable material.

A pair of opposing diaphragm seal rails 28 are provided along a lower edge of each sidewall 14 to receive weather tight diaphragm seal inserts, which are commonly mounted on vibration testing inserts and known in the environmental testing field. As is also known in the environmental testing field, a weather tight seal (not shown) extends along a lower edge of end wall 16 between diaphragm seal rails 28 to compliment the diaphragm seal inserts. Further, a perimeter seal 30 is provided on an inside surface of door 18.

A temperature and humidity control unit 32, which is commonly available and known in the industry, operates as an environment conditioning device and is connected with environmental chamber 12 to provide a temperature and humidity environment within test chamber 26 in accordance with preselected specifications.

Thermal shock insert 10 as configured for use with environmental chamber 12 discussed above, has a cabinet 40 defining a specimen chamber 42 inside the cabinet (FIGS. 1–3). Similar to environmental chamber 12, cabinet 40 is constructed with thick perimeter sidewalls 44 filled with non-settling and low thermal conductivity insulation, such as oven grade fiberglass insulation, for example. Cabinet 40 includes a bottom panel 46 and a top panel 48 of the same construction as perimeter sidewalls 44. The inner surface of cabinet 40 is most preferably clad with a series 300 stainless steel liner. As shown in FIGS. 2 and 3, top panel 48 has a chamber opening 50 through which a test specimen may pass into and out of specimen chamber 42. Thermal shock insert 10 preferably has a configuration which accommodates ease of insertion into and removable from environmental chamber 12 and is provided with diaphragm seal inserts 52 as discussed above. Diaphragm seal inserts 52 provide a vapor and thermal resistant seal between environmental chamber 12 and thermal shock insert 10.

While thermal shock insert 10 may be provided in various configurations, the insert 10 shown generally in FIGS. 1–3 has a rolling cart arrangement with cabinet 40 positioned above a high temperature conditioning plenum 60 and is provided with legs 70 and casters or wheels 72 for ease of transportability. Plenum 60 is provided with an air blower 62, heating coils 64, and a temperature controller 66, all of which are commonly available components, known in the environmental testing field. Plenum 60 is ducted in fluid communication with specimen chamber 42, so the specimen chamber 42 is maintained at a preselected temperature as controlled by controller 66.

A lid or door 80 is provided to close chamber opening 50. Lid 80 is also preferably constructed with a thick layer of non-settling and low thermal conductivity insulation with an appropriate, low thermal conductivity cladding of suitable, durable material as is known in the art. As is also known in the environmental testing field, a double "P" gasket 82 is provided around the perimeter of lid 80 to seal between lid 80 and cabinet 40 when the lid is in a closed position as shown in FIG. 2. "P" gasket 82 forms a vapor and thermal resistant seal that environmentally isolates specimen chamber 42 when lid 80 is in a closed position. Lid 80 is connected with cabinet 40 by a slide having at least a pair of slide stanchions 84 which are connected with and extend generally upward from a lift rail 86. Lift rail 86 spans generally transversely across and under cabinet 40. Raising lift rail 86 from a first or lowered position as shown in FIG. 2 to a second or elevated position as shown in FIG. 3 also raises lid 80 to open specimen chamber 42.

Specimens to be tested are positioned on a specimen platform 90 which is located in specimen chamber 42 and movable relative to cabinet 40 to move specimens through chamber opening 50 between a first position in which the specimen is contained within specimen chamber 42 (FIG. 2) and a second position in which the specimen is substantially outside specimen chamber 42 (FIG. 3) and located inside test chamber 26 when thermal shock insert 10 is coupled with environmental testing chamber 12 for testing. Thus, specimen platform 90 is also connected with slide stanchions 84 and moves in concert with lid 80 and lift rail 86. Double "P" gaskets 92 and 94 are also provided for sealing between specimen platform 90 and cabinet 40 when specimen platform 90 is in each of the first or lowered (FIG. 2) and second or elevated (FIG. 3) positions. Gaskets 92 operate along with specimen platform 90 to form an environmental seal and specimen chamber closure for specimen chamber 42 while in the elevated position. "P" gaskets 92 and 94 provide vapor and thermal resistant seals in order to environmentally isolate specimen chamber 42.

The task of lifting and lowering lid 80 and specimen platform 90 between the lowered and elevated positions may be accomplished by the attachment of an actuator 100 on the two opposing sidewalls 14 of environmental chamber 12. While each actuator 100 may be any of many apparent choices for an actuating device, the actuators 100 are preferably pneumatic lift cylinders having an actuator rod 102 with a shoe or other convenient coupling 104 at a distal end of the rod. With thermal shock insert 10 positioned within environmental chamber 12, a crossbeam 106 may be positioned to extend between and interconnect the shoes or couplings 104 of each of the actuators 100. So positioned, the crossbeam 106 will also extend under and engage lift rail 86. Thus, when actuators 100 are actuated to withdraw actuator rods 102, crossbeam 106 is lifted and, in turn, elevates lift rail 86 and each of lid 80 and specimen platform 90, which are connected by slide stanchions 84 with lift rail 86.

In practice, thermal shock insert 10 may be preloaded with a test specimen not shown, but will more likely be coupled with the environmental chamber 12 prior to disposing a test specimen upon specimen platform 90. After thermal shock insert 10 is coupled with environmental chamber 12, crossbeam 106 is positioned and fastened with actuator rods 102 by couplings 104. The actuators 100 may be energized to lift crossbeam 106, lift rail 86, lid 80, and specimen platform 90, whereby cabinet 40 is opened and specimen platform 90 is made accessible for placement of a test specimen.

Further, after the thermal shock insert 10 is coupled with environmental chamber 12 and a test specimen is positioned on specimen platform 90, door 18 may be closed and sealed. Specimen chamber 42 will then be brought to its preselected test temperature, while test chamber 26 is likewise brought to its preselected test chamber. Typically, test chamber 26 will be a cold chamber, while specimen chamber 42 will be a hot chamber for thermal shock testing. With the respective chambers at their respective temperatures, actuators 100 are cycled to elevate and lower specimen platform 90 and move the test specimen between the cold and hot temperature zones of test chamber 26 and specimen chamber 42, respectively, in accordance with preselected testing specifications.

An alternative configuration of a thermal shock insert according to the invention is shown in FIG. 4. The same reference numerals are used in FIG. 4 for similar or identical components as those used and identified in FIGS. 1–3. It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A thermal shock insert to adapt an environmental test chamber for thermal shock testing of a specimen, said insert comprising:
   an insert cabinet defining an interior chamber, said interior chamber extending through an insert opening in said insert cabinet;
   an adaptor seal configured and disposed to form an environmental seal between said insert cabinet and the environmental test chamber;
   a platform supporting said specimen and mounted on a stanchion slidably supported and extending through a floor of said interior chamber, said platform being movable relative to said insert cabinet to move the specimen supported on said platform between a first position in which said platform is substantially contained within said interior chamber and a second position in which said platform is substantially outside said interior chamber; and
   an actuator for slidably moving said stanchion and said platform between the first position in which the specimen is substantially contained within said interior chamber and the second position in which the specimen is substantially outside of said interior chamber and inside the environmental test chamber.

2. The insert defined in claim 1, wherein said insert further includes an interior chamber closure, said interior chamber closure providing vapor and thermal resistant sealing of said interior chamber when said platform is in said second position.

3. The insert defined in claim 1, wherein said adaptor seal includes first and second diaphragm seal inserts adapted for being received within opposing diaphragm seal rails provided along side walls of the environmental test chamber to mate said insert cabinet with the environmental test chamber, in vapor and thermal resistant sealing engagement.

4. The insert defined in claim 3 further including an insert cabinet door that provides vapor and thermal resistant closing of said insert opening in said insert cabinet.

5. The insert defined in claim 4, wherein said insert further includes an interior chamber closure, said interior chamber closure providing vapor and thermal resistant sealing of said interior chamber when said platform is in said second position.

6. A thermal shock test apparatus for use with a separate environmental test chamber device, the environmental test chamber device including a housing defining an environmental test chamber and a test environment conditioning unit operatively connected with the environmental test chamber to control selected environmental conditions in the environmental test chamber, the thermal shock test apparatus comprising:
   a thermal shock test insert separable from the environmental test chamber device, said thermal shock test insert having an insert cabinet adapted to be positioned proximate the environmental test chamber of the environmental test chamber device and defining a specimen chamber inside said insert cabinet, said insert cabinet including a specimen chamber opening, said specimen chamber opening providing communication between said specimen chamber and the outside of said insert cabinet;
   an insert environment conditioning unit operatively connected with said specimen chamber for controlling the environment within said specimen chamber according to selected specifications;
   a specimen platform mounted on a stanchion slidably supported and extending through a floor of said specimen chamber, said specimen platform being movable relative to said insert cabinet to move a specimen supported on said specimen platform through said specimen chamber opening; and
   an actuator for slidably moving said stanchion and said specimen platform between a first position in which the specimen is substantially contained within said specimen chamber and a second position in which the specimen is substantially outside of said specimen chamber and inside the environmental test chamber of the environmental test chamber device when positioned proximate said thermal shock test apparatus.

7. The test apparatus defined in claim 6, further comprising an adaptor seal configured and disposed to form an environmental seal between said thermal shock test insert and the environmental test chamber device, wherein said adaptor seal includes first and second diaphragm seal inserts adapted for being received within opposing diaphragm seal rails provided along side walls of the environmental test chamber device to mate said test adaptor with the environmental test chamber, in vapor and thermal resistant sealing engagement.

8. The test apparatus defined in claim 7 further including a door that provides vapor and thermal resistant closing of said specimen chamber opening.

9. The test apparatus defined in claim 8, wherein said thermal shock test insert further includes a specimen chamber closure, said specimen chamber closure providing vapor and thermal resistant sealing of said specimen chamber when said specimen platform is in said second position.

10. The test apparatus defined in claim 6 further including an insert cabinet door that provides vapor and thermal resistant closure of said specimen chamber opening.

11. The test apparatus defined in claim 10, wherein said thermal shock test insert further includes a specimen chamber closure, said Specimen chamber closure providing vapor and thermal resistant sealing of said specimen chamber when said specimen platform is in said second position.

12. The test apparatus defined in claim 6, wherein said thermal shock test insert further includes a specimen chamber closure, said specimen chamber closure providing vapor and thermal resistant sealing of said specimen chamber when said specimen platform is in said second position.

13. A thermal shock test adaptor used with a separate environmental test chamber device, the environmental test chamber device having a base supporting an environmental test chamber with an environmental test chamber opening thereto, comprising:
   an adaptor cabinet defining a specimen chamber inside said adaptor cabinet, said adaptor cabinet including a specimen chamber opening, said specimen chamber opening providing communication between said specimen chamber and the outside of said adaptor cabinet, said adaptor cabinet adapted to abut said environmental test chamber device and position said specimen chamber opening adjacent the environmental test chamber opening;
   an adaptor seal configured and disposed to form an environmental seal between said adaptor cabinet and the environmental test chamber device;
   an environment conditioning device operatively connected with said specimen chamber, said environment conditioning device controlling the environment within said specimen chamber according to selected specifications;

a specimen platform mounted on a stanchion slidably supported and extending through a floor of said specimen chamber, said specimen platform being movable relative to said adaptor cabinet to move a specimen supported on said specimen platform through said specimen chamber opening; and an actuator connectable to the environmental test chamber for moving said specimen platform between a first position in which the specimen is substantially contained within said specimen chamber and a second position in which the specimen is substantially outside of said specimen chamber and inside the environmental test chamber.

14. The test adaptor defined in claim 13, wherein said test adaptor further includes a specimen chamber closure, said specimen chamber closure providing vapor and thermal resistant sealing of said specimen chamber when said specimen platform is in said second position.

* * * * *